US008895097B2

(12) United States Patent
Farina

(10) Patent No.: US 8,895,097 B2
(45) Date of Patent: Nov. 25, 2014

(54) APPARATUS AND PROCESS FOR PREPARING FROZEN CONFECTIONERY PRODUCTS

(75) Inventor: Antonio Farina, Naples (IT)

(73) Assignee: Conopco Inc., Englewood Cliffs, NJ (US)

( * ) Notice: Subject to any disclaimer, the term of this patent is extended or adjusted under 35 U.S.C. 154(b) by 374 days.

(21) Appl. No.: 13/008,232

(22) Filed: Jan. 18, 2011

(65) Prior Publication Data
US 2011/0177209 A1 Jul. 21, 2011

(30) Foreign Application Priority Data
Jan. 19, 2010 (EP) ..................................... 10151088

(51) Int. Cl.
*A23G 9/00* (2006.01)
*A23C 3/00* (2006.01)
*A23L 3/36* (2006.01)
*C12C 7/26* (2006.01)
*A01J 11/00* (2006.01)
*A23C 1/00* (2006.01)
*A23G 9/48* (2006.01)
*A23G 9/28* (2006.01)
*A23G 9/50* (2006.01)

(52) U.S. Cl.
CPC *A23G 9/48* (2013.01); *A23G 9/288* (2013.01); *A23G 9/283* (2013.01); *A23G 9/282* (2013.01); *A23G 9/506* (2013.01)
USPC .............. 426/565; 426/101; 426/524; 99/452

(58) Field of Classification Search
USPC .................. 426/89, 100, 302, 101, 524, 565; 99/452
See application file for complete search history.

(56) References Cited

U.S. PATENT DOCUMENTS

| | | | |
|---|---|---|---|
| 2,695,572 A * | 11/1954 | Oakes | ........................... 222/427 |
| 2,784,681 A | 3/1957 | Orrell | |
| 3,149,756 A | 9/1964 | Carpigiani | |
| 3,323,321 A | 6/1967 | Carpigiani | |
| 3,347,287 A | 10/1967 | Geber | |
| 4,184,613 A | 1/1980 | Kinney | |

(Continued)

FOREIGN PATENT DOCUMENTS

| | | |
|---|---|---|
| AU | 442 661 | 2/1972 |
| CN | 1094897 A | 11/1994 |

(Continued)

OTHER PUBLICATIONS

Machine Translation of Kurth DE 2723320 Nov. 1978.*

(Continued)

*Primary Examiner* — Humera Sheikh
*Assistant Examiner* — Tynesha McClain-Coleman
(74) *Attorney, Agent, or Firm* — Gerard J. McGowan, Jr.

(57) ABSTRACT

A filling head apparatus for producing frozen confectionery products. The filling head 1 comprises a tubular housing 3 which surrounds and is coaxial with a piston 10, the tubular housing 3 comprising first and second chambers. The piston 10 is longitudinally movable within the housing between a closed position and an open position such that when the piston is in the closed position it closes an outlet of the first chamber and when the piston is in the open position the entry openings in the piston communicate with the second chamber.

11 Claims, 2 Drawing Sheets

(56) References Cited

U.S. PATENT DOCUMENTS

| | | | |
|---|---|---|---|
| 4,378,164 A | 3/1983 | Manfroni | |
| 4,427,703 A * | 1/1984 | Schafer et al. | 426/101 |
| 5,209,156 A | 5/1993 | Lombard | |
| 6,231,902 B1 | 5/2001 | Grassier | |
| 2003/0148007 A1 * | 8/2003 | Schevers et al. | 426/306 |
| 2005/0042348 A1 | 2/2005 | Huane | |

FOREIGN PATENT DOCUMENTS

| | | | |
|---|---|---|---|
| DE | 2723320 A * | 11/1978 | |
| EP | 0 615 692 A1 | 9/1994 | |
| EP | 0 678245 A1 | 10/1995 | |
| EP | 0 811 324 A1 | 12/1997 | |
| EP | 1 741 346 A1 | 1/2007 | |
| GB | 1165448 | 10/1969 | |
| GB | 2172541 A | 9/1996 | |
| JP | 3126123 B1 | 1/2001 | |
| WO | WO 88/02990 | 5/1988 | |
| WO | WO 2004/091324 A2 | 10/2004 | |
| WO | WO2005039302 A2 | 5/2005 | |
| WO | WO2005048730 A1 | 6/2005 | |
| WO | WO 2006056855 A1 * | 6/2006 | |

OTHER PUBLICATIONS

European Search Report Application No. EP 11 15 0818 dated May 9, 2011.

European Search Report Application No. EP 10 15 1088 dated Aug. 31, 2010.

EA Search Report dated 02 CEH 2011, Application No. 201100060 Unilever F3528.

CN Office Action/Search Report dated Apr. 24, 2013, 20110021591.7 Unilever F3528.

* cited by examiner

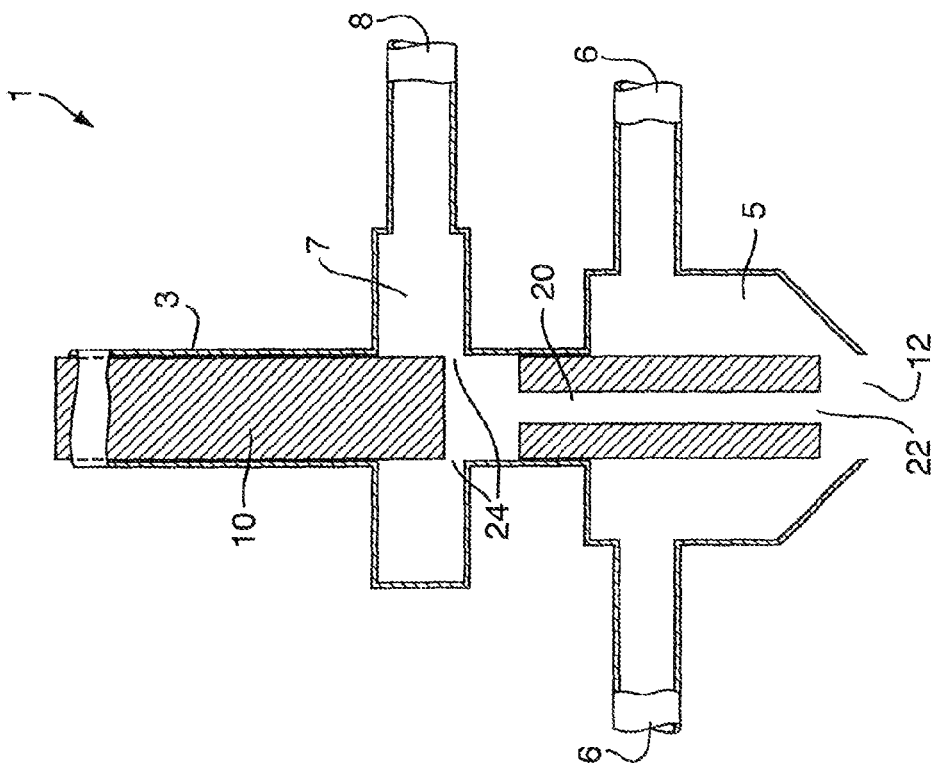
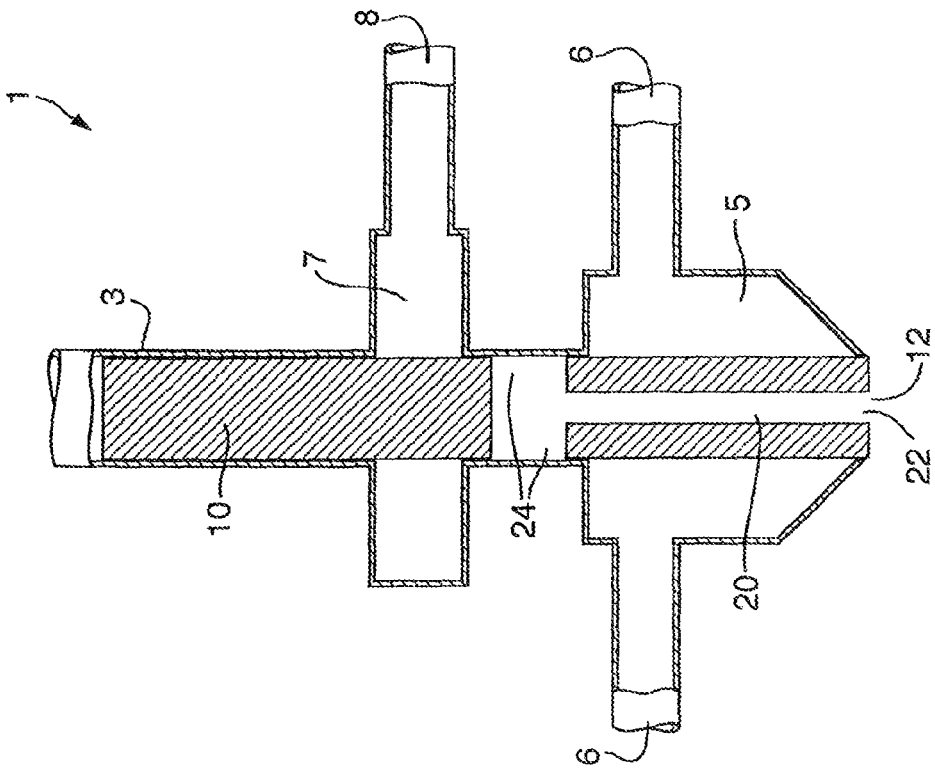

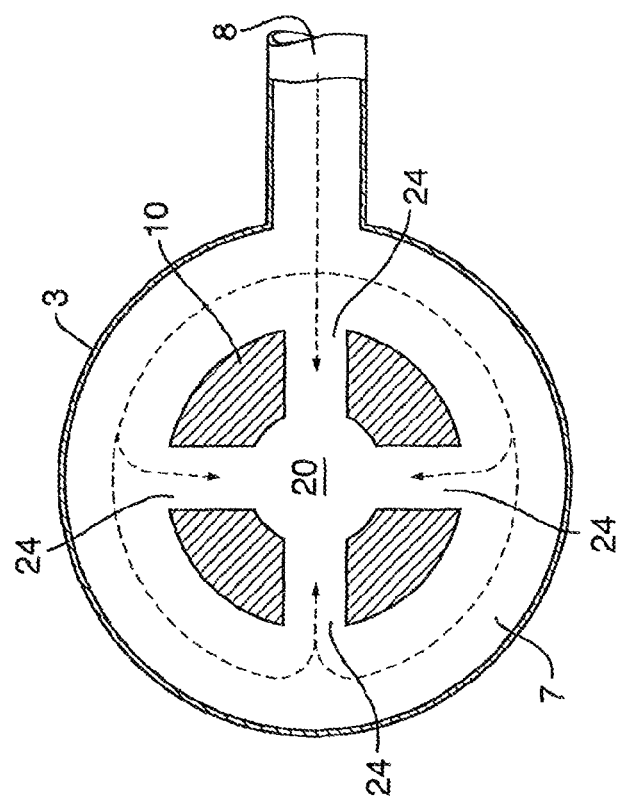
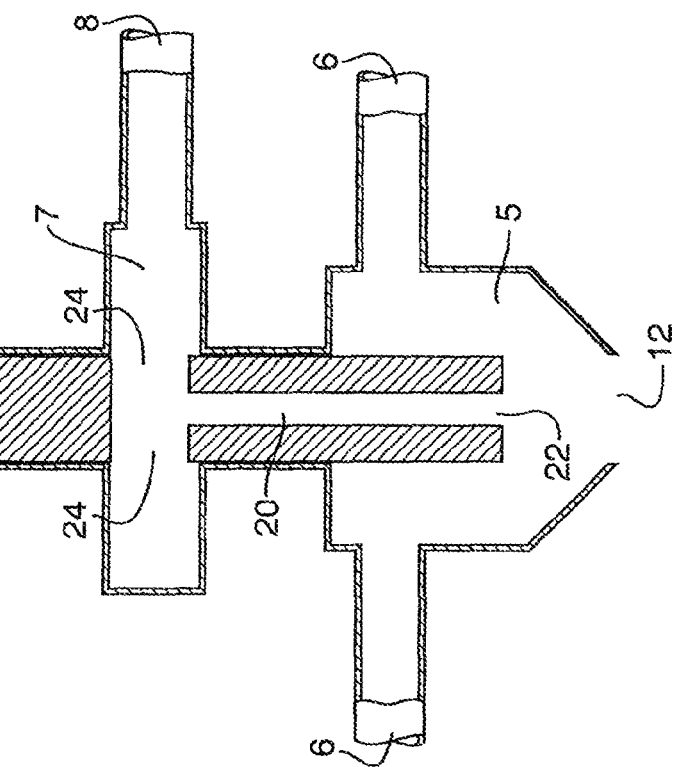

APPARATUS AND PROCESS FOR PREPARING FROZEN CONFECTIONERY PRODUCTS

TECHNICAL FIELD OF THE INVENTION

The present invention relates to an apparatus and process for producing frozen confectionery products, more particularly a process for incorporating fillings into individual frozen confectionery products.

BACKGROUND TO THE INVENTION

Ice cream cone products, such as Cornetto™ are popular and well-known. These products typically consist of a wafer cone filled with ice cream on top of which sauces or pieces of biscuit, nut or fruit are dispensed to provide an attractive appearance. Consumers are continually looking for new eating experiences, and conventional cone products may be perceived as somewhat old-fashioned and uninteresting. For example, they contain relatively small amounts of sauce, which is normally on top of the ice cream. There is a need to design ice cream products that give the consumer a more indulgent and interesting eating experience for example having sauces and/or inclusions incorporated with the ice cream. However, it is difficult to incorporate significant amounts of materials with very different rheological properties to ice cream (e.g. sauces, cookie dough or inclusions) using current methods.

Individual products, such as tubs and cones containing inclusions, are often produced by a process wherein ice cream is dispensed into a mould, cone or tub, from a nozzle; then the inclusions are added from a separate feeder, and then a further layer of ice cream is dispensed from the nozzle to cover the inclusions. However this process does not distribute the inclusions throughout the ice cream, and moreover is slow and inconvenient on an industrial scale.

WO 88/02990 discloses a method of making a frozen confection in which ice cream is co-extruded with sauce into a cone thereby forming central column of the sauce which extends throughout the height of the product. However, only a narrow column (less than about 10 mm in diameter) can be produced in this way. Moreover, liquid fillings that have a high yield stress and viscosity or that contain large amounts of solid inclusions cannot be dosed in this way.

GB 1165448 discloses a nozzle for a soft-ice cream machine comprising a piston valve with a housing in which the piston is longitudinally movable to open and close the valve. The piston has a longitudinally extending passage which on one hand opens in the piston end surface located in the outlet opening of the nozzle, and on the other hand the passage opens in the circumferential surface of the piston. The housing has an aperture connected by a pump to a supply container for flavouring. When the valve is opened to discharge ice-cream, the opening of the passage in the circumferential piston surface is caused to register with the aperture in the housing connected to the supply container and hence the flavouring can be introduced into the ice-cream portion being discharged. Whilst this type of nozzle is suitable for flavourings such as syrups/jams, it is not suitable for fillings that have a high yield stress and viscosity or that contain large amounts of solid inclusions because of the likelihood of blockages.

Thus there remains a need for an improved method for producing frozen confection products which contain large amounts of sauce and/or inclusions.

BRIEF DESCRIPTION OF THE INVENTION

We have now devised an apparatus and method which overcomes these problems. Accordingly, in a first aspect, the present invention provides a filling head apparatus for producing frozen confectionery products, the filling head comprising
 a tubular housing which surrounds and is coaxial with a piston,
  the tubular housing comprising first and second chambers, the first chamber having two or more inlets and an outlet, the second chamber having an inlet and opening onto the inside of the housing;
  the piston having a longitudinal passage which has an exit opening at the lower end of the piston and a plurality of entry openings into the circumferential surface of the piston;
 means for supplying a frozen confection to the inlets of the first chamber; and
 means for supplying a filling to the inlet of the second chamber;
 wherein the piston is longitudinally movable within the housing between a closed position and an open position, such that when the piston is in the closed position it closes the outlet of the first chamber and when the piston is in the open position the entry openings communicate with the second chamber.

Preferably the entry openings are positioned such that when the piston is moved within the housing to open the valve, the outlet is opened before the entry openings are in communication with the second chamber.

Preferably the piston has at least three entry openings.

Preferably the piston is free to rotate within the housing.

This apparatus allows the production of frozen confection products which contain a filling such as a viscous, dense sauce which contains solid inclusions. The filling can be encapsulated wholly within the frozen confection in a single dosing step.

In a second aspect, the present invention provides a process for producing frozen confectionery products, the process comprising:
 providing an apparatus according to the first aspect of the invention;
 supplying a frozen confection to the inlets of the first chamber;
 supplying a filling to the inlet of the second chamber;
 moving the piston longitudinally within the housing from the closed position to an open position so that the outlet of the first chamber is opened and so that the entry openings communicate with the second chamber thereby allowing the filling to pass through the longitudinal passage in the piston and into the first chamber; and
 dispensing the frozen confection and filling from the outlet of the first chamber into a receptacle.

Preferably the filling constitutes at least 20 wt % of the product.

Preferably the filling comprises solid inclusions of from 1 to 10 mm in size. More preferably the filling is a liquid having solid inclusions suspended within it.

Preferably the frozen confection is ice cream.

Preferably the receptacle is an edible cone.

In one embodiment the frozen confection which is supplied to the inlets of the first chamber contains inclusions.

DETAILED DESCRIPTION OF THE INVENTION

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, 6$^{th}$ Edition, R. T. Marshall, H. D. Goff and R. W. Hartel (2003), Kluwer Academic/Plenum Publishers. All percentages, unless otherwise stated, refer to the percentage by weight, with the exception of percentages cited in relation to the overrun.

The term "frozen confection" means a sweet-tasting fabricated foodstuff in the frozen state (i.e. under conditions wherein the temperature of the foodstuff is less than 0° C., and preferably under conditions wherein the foodstuff comprises significant amounts of ice). Frozen confections include ice cream, water ice, sorbet, sherbet, frozen yoghurt and the like. Frozen confections may be aerated or unaerated. By unaerated is meant an overrun of less then 20%, preferably less than 10%. An unaerated frozen confection is not subjected to deliberate steps such as whipping to increase the gas content. Nonetheless, it will be appreciated that during the preparation of unaerated frozen confections, low levels of gas, such as air, may be incorporated in the product. Aerated frozen confections have an overrun of more than 20%, preferably more than 50%, more preferably more than 75%. Preferably the frozen confection has an overrun of less than 200%, more preferably less than 150%, most preferably less than 120%. Overrun is defined by the equation below and is measured at atmospheric pressure $$\text{overrun \%} = \frac{\text{density of mix} - \text{density of frozen confection}}{\text{density of frozen confection}} \times 100$$

The frozen confection may be manufactured by any suitable process, typically by preparing a mix of ingredients; then pasteurising and optionally homogenising the mix; and then freezing and optionally aerating the mix to produce the frozen confection.

The filling material may be any filling typically used in frozen confections, and may be liquid or solid. The relative amounts of frozen confection and filling are controlled by adjusting the flow rate of the frozen confection and the flow rate of liquid fillings and/or the dose rate of solid fillings. Preferably the filling constitutes at least 20%, more preferably at least 30% or 40%, even more preferably at least 50%, most preferably at least 60% of the total weight of frozen confection and filling. Preferably the filling constitutes at most 90%, more preferably at most 80% of the total weight of frozen confection and filling.

Solid fillings are one or more discrete pieces of an edible material ("inclusions"), such as chocolate, fruit (which may be e.g. fresh, dried, frozen or sugar-infused), nut, biscuit, cake, cookie, toffee, fudge, nougat, marshmallow and the like. Preferably the solid inclusions are from 1 mm to 10 mm in size, more preferably from 2 to 9 mm, most preferably from 5 to 8 mm.

Suitable liquid fillings include fat-based compositions such as chocolate or couverture (i.e. a chocolate analogue containing a fat other than cocoa butter); fruit purees/sauces; creams, cookie dough, biscuit pastes, honey, syrups, caramel, toffee, nougat or fudge sauces and the like. The filling may be in the form of a fondant or a paste. The filling may be aerated, for example a fruit or chocolate mousse. The filling may also be a frozen confection which differs in some way (such as in formulation, texture, flavour or colouring) from the main frozen confection. We have found that the method and apparatus of the invention allow highly viscous liquid fillings to be dosed. For example, the liquid filling may have a viscosity of at least 100 mPas, more preferably at least 500 mPas, most preferably at least 1000 mPas (measured using a TA Instruments, AR 2000 rheometer with a concentric cylinder system at room temperature and a shear rate of 10 s$^{-1}$).

The filling may be a mixture of one or more of the fillings described above. For example, liquid fillings may have solid inclusions suspended within them. In this case the inclusions are introduced into the liquid filling before the combined filling is pumped to the chamber. The amount of solid inclusions is preferably at least 2% by weight of the total filling (i.e. the combined amount of solid inclusions and liquid filling), more preferably at least 5 wt %. Preferably the amount of solid inclusions is less than 30 wt %, more preferably less than 20 wt %.

The frozen confection itself may also contain inclusions which are mixed into the frozen confection before the frozen confection is supplied to the inlets of the first chamber. Preferably the inclusions in the frozen confection are from 1 mm to 5 mm in size, more preferably from 3 to 4 mm. The amount of inclusions is preferably at least 2% by weight of the combined amount of these inclusions and the frozen confection, more preferably at least 5 wt %. Preferably the amount of inclusions is less than 20 wt %, more preferably less than 10 wt %. Adding inclusions into the frozen confection (as well as the filling) provides further interest for the consumer, and can also provide contrasting flavours and textures.

The frozen confectionery products that are produced by the process of the invention are typically single serving products e.g. 50-500 mL, preferably 70-200 mL in size. The frozen confection is preferably contained in a receptacle, which may be edible (e.g. a wafer or chocolate cone) or inedible (e.g. a tub).

The present invention will now be further described with reference to the figures wherein:

FIG. 1 shows a schematic diagram of an apparatus according to the invention with the piston in the closed position.

FIG. 2 shows the apparatus with the piston partly raised.

FIG. 3 shows the apparatus with the piston raised further so that the entry openings in the piston are adjacent to the second chamber.

FIG. 4 shows a schematic view of the flow of the filling through the second chamber.

The filling head 1 is shown in FIGS. 1 to 3. The filling head 1 comprises a tubular housing 3 which surrounds and is coaxial with a piston 10. The tubular housing 3 has a first chamber 5 with two inlets 6 through which a supply means (e.g. an ice cream freezer—not shown) supplies the first chamber 5 with frozen confection. The two inlets 6 to the first chamber 5 are preferably positioned on opposite sides of the first chamber. The filling head may have more than two inlets to the first chamber, in which case the inlets are preferably distributed evenly around the first chamber; for example three inlets would be positioned at approximately 120° from each other. The tubular housing 3 has a second chamber 7 with an inlet 8 through which a supply means (e.g. a pump) supplies the second chamber 7 with a stream of filling. The second chamber may have more than one such inlet 8. The first chamber 5 has an outlet 12 from which the frozen confection and filling is dispensed.

The piston 10, which is shown in cross-section in the Figures, is a cylinder which fits within the tubular housing 3. The piston 10 can be moved longitudinally within the housing 3 by a driver (not shown). The piston is preferably also free to rotate within the housing. When the piston is in its lowest position (FIG. 1) the lower end of the piston closes the outlet 12 so that the frozen confection cannot flow out of the first chamber 5. When the piston is raised (FIGS. 2 and 3) the first chamber 5 is in communication with the outlet 12 so that frozen confection can flow out. Thus the movement of the piston 10 controls the opening and closing of the outlet 12.

The piston 10 has a longitudinal passage 20, e.g. a cylindrical bore, which extends from an exit opening 22 at the lower end of the piston. The exit opening 22 opens directly into the outlet 12 when the piston is in its lowest position as shown in FIG. 1. When the piston is raised, the exit opening 22 opens into the first chamber 5 as shown in FIGS. 2 and 3. The longitudinal passage 20 extends along the axis of the piston for part of the piston's length. At the upper end of the longitudinal passage 20 there is a plurality of entry openings 24 into the circumferential surface of the piston. Preferably the piston has at least three entry openings, more preferably four entry openings. When the piston is in its lowest position (FIG. 1), the entry openings are adjacent to, and therefore closed by, the inner surface of the tubular housing 3. When the piston is partially raised (FIG. 2) the entry openings move upwards and begin to come into communication with the second chamber 7. The filling can then flow from the second chamber 7 into the entry openings 24, along the longitudinal passage 20 through the piston and out through the exit opening 22 into the first chamber 5 from which it is coextruded with the frozen confection through the outlet 12. When the piston is raised further (FIG. 3) the entry openings 24 are fully aligned with the second chamber 7 thereby maximising the flow of filling from the second chamber 7 into the entry openings 24.

In the nozzle disclosed in GB 1 165 448, the filling is supplied to the passage in the piston from a single aperture in the housing. This requires that the piston cannot rotate within the housing otherwise the opening in the piston might not align with the aperture in the housing. However, as shown in FIG. 4, the filling is supplied to the second chamber 7 which is open all around the inside of the housing. Thus each of the plurality of entry openings 24 in the piston is in communication with the second chamber 7 when the piston is raised. Since there is no need for rotational alignment, the piston is preferably free to rotate within the housing. This has the advantage that there is no need for means of holding the piston in rotational alignment, such as pins. Such pins are undesirable since their presence can result in leakage of liquid fillings.

The inlet 8 to the second chamber, the passage within the piston 20, the exit opening 22 and the entry openings 24 are large enough to allow solid inclusions in the filling to pass through them. Preferably the inlet to the second chamber, the passage and the openings are at least 10 mm in diameter, more preferably at least 15 mm, most preferably at least 20 mm. This prevents blockages from occurring, and also allows a suitable flow rate when the filling comprises a viscous liquid. In particular, the combination of the second chamber being fully open onto the inside of the housing, the plurality of entry openings (in contrast to the single apertures in GB 1 165 448) and the sizes of the inlet, passage and openings allow viscous fillings which contain solid pieces to be dispensed from the filling head. The edges of the entry openings are preferably sharp so that solid inclusions which happen to be within the entry opening as the piston is moving are cut by the edges.

The filling head is made of a material suitable for use with food, such as stainless steel.

The filling head is typically positioned above a conveyer carrying a plurality of wafer cones, tubs or other receptacles. In use, the conveyer translates an empty receptacle into position below the filling head, where it is held static for filling. The filling head may then be lowered to a position wherein the outlet is in the vicinity of the bottom of the receptacle. The piston which is initially in its lowest (closed) position is then raised thereby allowing the frozen confection to flow through the first chamber and out of the outlet. Initially, no filling can flow because the entry openings are not yet in communication with the second chamber so at first only the frozen confection leaves the outlet. Then as the piston is raised to the point at which the entry openings come into communication with the second chamber, filling begins to flow from the second chamber through the passage in the piston and into the first chamber. It is then coextruded from the outlet with the frozen confection. The piston may continue to be raised so that the entry openings are above the level of the second chamber. This enables, if desired, the flow of filling to be interrupted whilst still continuing to dispense the frozen confection. As the receptacle is filled, the filling head may be progressively raised to keep the outlet slightly above the filling line. Once the required amount of frozen confection and filling has been dispensed into the receptacle, the piston is moved rapidly back to its lower position so that the piston interrupts the flows of filling and then frozen confection. Since the flow of filling is interrupted during the first and last parts of the piston motion, the filling is encapsulated within the frozen confection.

We have found that having at least two inlets to the first chamber ensures that the filling of viscous liquid and/or solid inclusions is enclosed within the frozen confection. In contrast, if the first chamber only has a single inlet, the filling tends to be pushed to the side of the outlet which is opposite the inlet. Hence the filling is exposed on one side of the product, rather than being fully enclosed within the frozen confection.

Finally the conveyer carries the filled receptacle away from the filling head (e.g. to a hardening tunnel) whilst simultaneously translating another empty receptacle to the position below the outlet, ready to be filled.

The various features of the embodiments of the present invention referred to in individual sections above apply, as appropriate, to other sections mutatis mutandis. Consequently features specified in one section may be combined with features specified in other sections as appropriate. Various modifications of the described modes for carrying out the invention which are apparent to those skilled in the relevant fields are intended to be within the scope of the following claims.

The invention claimed is:

1. A filling head apparatus for producing frozen confectionery products, the filling head (1) comprising:
   a tubular housing (3) which surrounds and is coaxial with a piston (10)
   the tubular housing (3) comprising first and second chambers, the first chamber (5) having two or more inlets (6) and an outlet (12) the second chamber (7) having an inlet (8) and opening onto the inside of the tubular housing (3)
   the piston having a longitudinal passage (20) which has an exit opening (22) at the lower end of the piston (10) and a plurality of entry openings (24) into the circumferential surface of the piston;
   a first chamber supplier for supplying a frozen confection to the inlets (6) of the first chamber;
   and
   a second chamber supplier for supplying a filling to the inlet (8) second chamber;
   wherein the piston (10) is longitudinally movable within the tubular housing between a closed position and an open position, such that when the piston is in the closed position it closes the outlet of the first chamber and when the piston is in the open position the entry openings communicate with the second chamber.

2. The apparatus according to claim 1 wherein the entry openings are positioned such that when the piston is moved within the tubular housing to open the valve, the outlet is opened before the entry openings are in communication with the second chamber.

3. The apparatus according to claim 1 wherein the piston has at least three entry openings.

4. The apparatus according to claim 1 wherein the piston is free to rotate within the tubular housing.

5. A process for producing frozen confectionery products, the process comprising:
   providing an apparatus for producing frozen confectionery products, including a filling head comprising
      a tubular housing which surrounds and is coaxial with a piston, the tubular housing comprising first and second chambers, the first chamber having two or more inlets and an outlet, the second chamber having an inlet and opening onto the inside of the housing;
      the piston having a longitudinal passage which has an exit opening at a lower end of the piston and a plurality of entry openings into the circumferential surface of the piston;
      a first inlet supplier for supplying a frozen confection to the inlets of the first chamber; and
      a second inlet supplier for supplying a filling to the inlet of the second chamber;
      wherein the piston is longitudinally movable within the housing between a closed position and an open position, such that when the piston is closed position it closes the outlet of the first chamber and when the piston is in the open position the entry openings communicate with the second chamber;
   supplying a frozen confection to the inlets of the first chamber;
   supplying a filling to the inlet of the second chamber;
   moving the piston longitudinally within the housing from the closed position to an open position so that the outlet of the first chamber is opened and so that the entry openings communicate with the second chamber thereby allowing the filling to pass through the longitudinal passage in the piston and into the first chamber; and
   dispensing the frozen confection and filling from the outlet of the first chamber into a receptacle.

6. The process according to claim 5 wherein the filling constitutes at least 20 a of the products.

7. The process according to claim 5 wherein the ing comprises solid inclusions of from 1 to 10 mm in size.

8. The process according to claim 7 wherein the filling comprises a liquid having solid inclusions suspended within it.

9. The process according to claim 5 wherein the frozen confection is ice cream.

10. The process according to claim 5 wherein the receptacle is an edible cone.

11. The process according to claim 5 wherein the frozen confection which is supplied to the inlets of the first chamber contains inclusions.

* * * * *